UNITED STATES PATENT OFFICE.

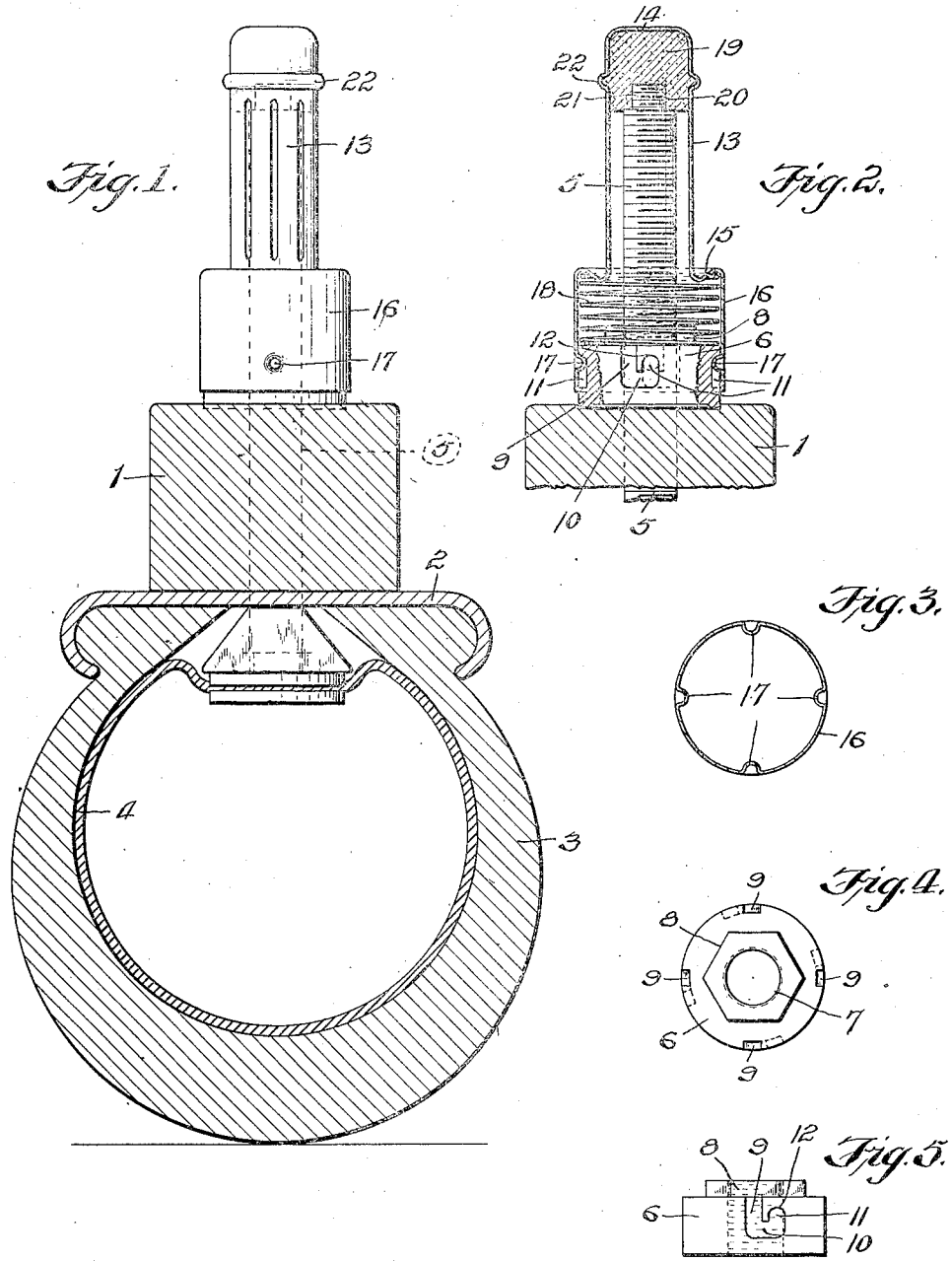

JAMES SHAW, OF ST. LOUIS, MISSOURI.

DUST-CAP FOR PROTECTING AUTOMOBILE-TIRE VALVES.

1,335,861.  Specification of Letters Patent.  Patented Apr. 6, 1920.

Application filed April 1, 1918. Serial No. 225,923.

*To all whom it may concern:*

Be it known that I, JAMES SHAW, a citizen of the United States, residing in the city of St. Louis and State of Missouri, have invented certain new and novel Improvements in Dust-Caps for Protecting Automobile-Tire Valves.

My invention relates to improvements in dust-caps for protecting automobile tire-valves, including a simple and efficient fastening means for securely retaining the dust-cap when positioned in a locked position over the tire-valve, and, has for its object, to overcome certain practical objections to, and defects in, the usual dust-cap having screw threaded connection with the tire-valve.

A further object of the invention is to provide means whereby the dust-cap may be readily and quickly applied to, or removed from a lock-nut carried by the tire-valve and thereby eliminate the use of the usual threaded connection between the dust-cap and the tire-valve.

With the above and other objects in view, the invention consists in certain novel features of construction, arrangements and combinations of parts as will be hereinafter more fully described, and finally pointed out in the claims hereto appended.

Referring to the accompanying drawings forming a part of this specification wherein like characters of reference denote similar parts throughout the several views:

Figure 1, is a sectional view of a pneumatic tire applied to a wheel-rim and showing in side elevation a dust-cap constructed in accordance with my invention.

Fig. 2, is a sectional view of a dust-cap in its locked assembled position and shown as enveloping a tire-valve.

Fig. 3, is a transverse sectional view of the dust-cap taken through the fastener-heads carried thereby.

Fig. 4, is a top plan view of my improved lock-nut to which the dust-cap is adapted to be fastened.

Fig. 5, is a side elevation of the lock-nut.

Referring to the accompanying drawings, the reference character 1 designates a wheel-rim; 2, a tire rim carried thereby; 3, a casing carried by the tire rim; 4, an inner tube carried within the casing; and 5, the usual valve-stem fixed to the inner tube and which is adapted to pass through the tire-rim 2 and wheel-rim 1 in the usual well known manner.

A lock-nut 6, having a threaded passage 7, is adapted to have threaded connection with the tire valve 5 and be carried thereby. The lower face of the lock-nut 6 is adapted to engage the inner face of the wheel-rim 1. The upper face of the lock-nut is provided with a suitably shaped shoulder 8 to permit the lock-nut 6 to be tightened or loosened by means of a suitable wrench or similar tool. The peripheral face of the lock-nut 6 is provided with a plurality of vertically disposed grooves 9 having open upper ends and each groove continuing at its lower end in a horizontally disposed groove 10, which latter groove in turn terminates in a vertically disposed groove or socket 11 having a closed upper end adapted to act as a stop or shoulder 12. These grooves form substantially J-shaped sockets, as is manifest.

The dust-cap employed by me consists of an upper tubular body 13, having the upper closed end 14. The lower end of the tubular body 13 of the dust-cap preferably extends outwardly and slightly upward as at 15 to provide a shoulder, and then terminates in a downward extending vertically disposed lower tubular body 16 considerably larger in diameter than the tubular body 13. The lower tubular body portion 16 of the dust-cap is provided a suitable distance above its lower edge with a plurality of equally spaced and suitably shaped inwardly projecting indentations or fastener-heads 17.

A suitable coiled-spring 18 is carried within the lower tubular body portion 16 of the dust-cap and arranged between the fastener-heads 17 and the shoulder wall portion 15 uniting the lower tubular body portion 16 with the upper tubular body portion 13 of the dust-cap.

To fasten the dust-cap to the lock-nut, the dust-cap is positioned over the tire-valve 5 and then the fastener-heads 17 thereof are adapted to be forced downwardly through the grooves 9 to the bottom thereof. The dust-cap is then given a partial turn permitting the fastener-heads 17 to move in the horizontally disposed slots 10 the full length thereof. When the dust-cap has been turned to this position it may be released and the coiled spring 18, the bottom edge of which is now in engagement with the top face of the lock-nut 6 will exert an upward pressure against the shoulder wall 15 of the dust-cap thereby forcing or moving the fastener-heads 17 upwardly into the vertically disposed slots 11 until they engage the shoulders or stops 12 formed by the upper closed ends of the slots 11.

A suitable packing 19, such as leather, asbestos or the like is adapted to be positioned in the upper end of the tubular body portion 13 of the dust-cap and is preferably provided with the opening or recess 20 adapted for the reception of the extreme upper end 21 of the valve-stem 5, to assist in firmly retaining the dust-cap in its adjusted or locked position over the tire valve-stem. The upper end of the body portion 13 of the dust-cap may be provided with an outwardly pressed bead 22 to act as a retainer or fastener for the packing 19 to prevent its displacement.

From the foregoing description it will be seen that after the dust-cap has been positioned and locked into engagement with the lock-nut 6 by a partial turn of the dust-cap that the coiled spring 18 will prevent the dust-cap from becoming loose and working its way out of locked engagement with the lock-nut 6, thus overcoming the practical objection to a dust-cap having threaded connection with a valve-stem which, by constant jar and vibration in traveling over a road bed, gradually unloosens itself by gradually turning due to the threaded connection and finally becoming lost by working its way out of threaded connection with the valve-stem.

To remove the dust-cap from the lock-nut 6 carried by the valve-stem 5 a downward pressure is exerted upon the dust-cap sufficient to force the fastener heads 17 out of engagement with the vertically disposed grooved sockets 11 into engagement with the horizontally disposed connecting grooves 10. After the dust-cap has assumed this position it may be removed from the lock-nut by giving it a partial turn and then an upward pull which will withdraw the fastener heads 17 from the vertically disposed grooves 9. Owing to the fact that the lower edge of the coiled spring 18 engages the fastener-heads 17 of the dust-cap when removed from the lock-nut 6, it will be understood that the coiled spring 18 will be held in its expanded position within the lower body portion 16 of the dust-cap after it has been removed from the lock-nut 6, thereby preventing the same from dropping out of the dust-cap and becoming lost.

The many advantages of the herein described invention due to the construction shown and the method of adjustment of the dust-cap upon the lock-nut will be readily apparent to those skilled in the art to which the invention appertains.

While I have described the principle of operation or adjustment of the invention, together with the structure of device I now consider to be the best embodiment thereof, I desire to have it clearly understood that the device shown is merely illustrative and that I reserve the right to make any such changes or modifications as may fairly fall within the principle of the invention and within the scope of the appended claims when fairly construed.

What I claim is:

1. The combination with a tire-valve-stem, of a lock-nut adapted to be carried by said valve-stem and having a plurality of substantially J-shaped sockets formed in the peripheral face thereof, a dust-cap, a plurality of inwardly extending fastener-heads carried near the lower edge thereof adapted to engage in said sockets, resilient means carried within the dust-cap adapted to yieldingly hold the dust-cap in its locked position to prevent relative rotation thereof and a packing positioned in the upper end of said dust-cap adapted to partially receive the upper end of the valve-stem to add stability to the dust-cap when positioned thereover.

2. In combination with a valve stem having its periphery threaded, a lock nut threaded upon the valve stem, a plurality of oppositely disposed sockets formed in the periphery of the nut lock with one end thereof terminating with the upper face of the nut lock, a tubular cap having its lower end larger in diameter than its upper end to form a shoulder at the upper end of the enlarged section of the cap, a plurality of oppositely disposed projections extending inwardly from the wall of the enlarged lower section of the cap, a coiled spring interposed between the aforesaid shoulder and said projections, said projections being receivable in the peripheral sockets of the nut lock through the open ends of the sockets, said sockets being so formed that by pressing the cap downwardly over the nut lock the coiled spring will be depressed by coming into contact with the upper surface of the nut lock, said cap being capable of slight rotation when the projections have reached their lowermost positions and permitted to rise a slight distance at the end of its rotary movement due to the coiled spring thereby locking itself against being accidentally disconnected from the lock nut.

In testimony whereof I have hereunto signed my name to the specification.

JAMES SHAW.